US010134056B2

(12) United States Patent
Schory et al.

(10) Patent No.: US 10,134,056 B2
(45) Date of Patent: Nov. 20, 2018

(54) SYSTEMS AND METHODS FOR PROVIDING INFORMATION BASED ON LOCATION

(75) Inventors: Guy Schory, San Francisco, CA (US); Robert Dean Veres, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 747 days.

(21) Appl. No.: 13/329,168

(22) Filed: Dec. 16, 2011

(65) Prior Publication Data

US 2013/0159097 A1 Jun. 20, 2013

(51) Int. Cl.
*G06Q 30/00* (2012.01)
*G06Q 30/02* (2012.01)

(52) U.S. Cl.
CPC ..... *G06Q 30/0261* (2013.01); *G06Q 30/0239* (2013.01); *G06Q 30/0267* (2013.01)

(58) Field of Classification Search
CPC ....... G06Q 30/0261; G06Q 30/0207–30/0239; G06Q 30/0601–30/0643
USPC ..................................................... 705/14.58
See application file for complete search history.

(56) References Cited

U.S. PATENT DOCUMENTS

| 6,744,938 | B1* | 6/2004 | Rantze ..................... G06K 9/00 382/312 |
| 7,010,498 | B1* | 3/2006 | Berstis ........................ 705/14.38 |
| 7,233,913 | B2* | 6/2007 | Scroggie et al. .......... 705/14.35 |
| 7,295,132 | B2* | 11/2007 | Steiner ........................... 340/8.1 |
| 7,344,080 | B2 | 3/2008 | Vinogradov et al. |
| 7,451,177 | B1* | 11/2008 | Johnson et al. .............. 709/203 |
| 7,460,953 | B2* | 12/2008 | Herbst ............... G01C 21/3638 340/995.19 |
| 7,660,747 | B2* | 2/2010 | Brice et al. ................ 705/14.63 |
| 7,707,073 | B2* | 4/2010 | Bloebaum et al. .......... 705/26.8 |
| 7,716,080 | B2 | 5/2010 | Postrel |

(Continued)

FOREIGN PATENT DOCUMENTS

| CN | 101499154 A | 8/2009 |
| CN | 102279918 A | 12/2011 |

(Continued)

OTHER PUBLICATIONS

"International Application Serial No. PCT/US2012/069281, International Search Report dated Feb. 15, 2013", 2 pgs.

(Continued)

*Primary Examiner* — Raquel Alvarez
(74) *Attorney, Agent, or Firm* — Wolfe-SBMC

(57) ABSTRACT

Systems and methods for providing information based on a user's location are described. A system may include an inventory module to identify an instance of a product within a field of vision of a user. A search module may identify incentives to purchase the product. A location module may generate a pictorial representation of the field of vision where an image of the product is located within the pictorial representation based on the position of the product in the field of vision of the user. A mapping module may map an icon representing at least one of the one or more incentives to a location within the pictorial representation corresponding to the position of the product. A display module may provide a user interface including a display comprising the icon located within the pictorial representation at a location corresponding to the position of the image of the product.

22 Claims, 6 Drawing Sheets

(56) References Cited

U.S. PATENT DOCUMENTS

| | | | |
|---|---|---|---|
| 7,757,944 B2* | 7/2010 | Cline et al. | 235/383 |
| 7,827,577 B2* | 11/2010 | Pack | G06Q 30/02 |
| | | | 725/44 |
| 8,458,019 B2* | 6/2013 | Sergiades | 705/14.1 |
| 8,645,220 B2* | 2/2014 | Harper et al. | 705/26.1 |
| 2002/0084330 A1 | 7/2002 | Chiu | |
| 2002/0128903 A1* | 9/2002 | Kernahan | 705/14 |
| 2005/0055273 A1* | 3/2005 | Phillips et al. | 705/14 |
| 2005/0102181 A1 | 5/2005 | Scroggie et al. | |
| 2006/0099964 A1 | 5/2006 | Barrese et al. | |
| 2006/0283941 A1 | 12/2006 | Singer-Harter | |
| 2006/0289637 A1 | 12/2006 | Brice et al. | |
| 2006/0293968 A1 | 12/2006 | Brice et al. | |
| 2008/0015944 A1* | 1/2008 | Nose et al. | 705/22 |
| 2008/0071559 A1* | 3/2008 | Arrasvuori | 705/1 |
| 2008/0249870 A1 | 10/2008 | Angell et al. | |
| 2008/0268876 A1* | 10/2008 | Gelfand et al. | 455/457 |
| 2009/0031071 A1* | 1/2009 | Chiu | 711/100 |
| 2009/0094140 A1* | 4/2009 | Kwan | G06Q 10/087 |
| | | | 705/28 |
| 2009/0096628 A1* | 4/2009 | Moscovitch | G08B 5/36 |
| | | | 340/691.6 |
| 2009/0157475 A1 | 6/2009 | Crafton et al. | |
| 2009/0222337 A1 | 9/2009 | Sergiades | |
| 2009/0287587 A1 | 11/2009 | Bloebaum et al. | |
| 2009/0289764 A1* | 11/2009 | Chiu | 340/10.1 |
| 2010/0085257 A1 | 4/2010 | Kalliola et al. | |
| 2010/0106662 A1* | 4/2010 | Ramaswamy | G01C 21/20 |
| | | | 705/323 |
| 2011/0029360 A1* | 2/2011 | Gollapalli | 705/14.1 |
| 2011/0082729 A1* | 4/2011 | Carvallo et al. | 705/14.13 |
| 2011/0178863 A1* | 7/2011 | Daigle | 705/14.31 |
| 2011/0214082 A1 | 9/2011 | Osterhout et al. | |
| 2012/0029998 A1* | 2/2012 | Aversano | G06Q 30/00 |
| | | | 705/14.27 |
| 2012/0059691 A1* | 3/2012 | Miles et al. | 705/14.1 |
| 2012/0062596 A1* | 3/2012 | Bedi et al. | 345/633 |

FOREIGN PATENT DOCUMENTS

| | | |
|---|---|---|
| CN | 104040578 A | 9/2014 |
| KR | 1020100003102 A | 1/2010 |
| KR | 101039647 B1 | 6/2011 |
| KR | 101091349 B1 | 12/2011 |
| WO | WO-2011122654 A1 | 10/2011 |
| WO | WO-2013090447 A1 | 6/2013 |

OTHER PUBLICATIONS

"International Application Serial No. PCT/US2012/069281, Written Opinion dated Feb. 15, 2013", 4 pgs.
"European Application Serial No. 12857280.7, Response dated Dec. 9, 2014", 9 pgs.
"International Application Serial No. PCT/US2012/069281, International Preliminary Report on Patentability dated Jun. 26, 2014", 6 pgs.
"Canadian Application Serial No. 2,856,863, Office Action dated Oct. 26, 2015", 5 pgs.
"Canadian Application Serial No. 2,856,863, Response dated Apr. 22, 2016 to Office Action dated Oct. 26, 2015", 14 pgs.
"Korean Application Serial No. 2014-7019728, Response dated Jan. 19, 2016 to Office Action dated Oct. 19, 2015", with English translation of claims, 31 pgs.
"Australian Application Serial No. 2012352342, Response dated Sep. 1, 2015", 24 pgs.
"European Application Serial No. 12857280.7, Extended European Search Report dated Apr. 2, 2015", 8 pgs.
"European Application Serial No. 12857280.7, Response dated Oct. 30, 2015", 15 pgs.
"Korean Application Serial No. 2014-7019728, Office Action dated Oct. 19, 2015", with English translation of claims, 12 pgs.
"Chinese Application Serial No. 201280062205.1, Office Action dated May 24, 2016", with English translation of claims, 21 pgs.
"Korean Application Serial No. 2014-7019728, Final Office Action dated May 26, 2016", W/ English Translation, 6 pgs.
"Canadian Application Serial No. 2,856,863, Office Action dated Sep. 23, 2016", 5 pgs.
"Chinese Application Serial No. 201280062205.1, Response dated Oct. 8, 2016 to Office Action dated May 24, 2016", with machine translation, 15 pgs.
"Chinese Office Action Application Serial No. 201280062205.1, Office Action dated Nov. 9, 2016", with English translation of claims, 21 pgs.
"Korean Application Serial No. 2014-7019728, Appeal dated Oct. 31, 2016", with machine translation, 49 pgs.
"Korean Application Serial No. 2014-7019728, Final Office Action dated Sep. 22, 2016", with English translation of claims, 6 pgs.
"Korean Application Serial No. 2016-7023421, Office Action dated Sep. 6, 2016", with English translation of claims, 13 pgs.
"Australian Application Serial No. 2016200989, Subsequent Examiners Report dated May 29, 2017" 4 pgs.
"Australian Application Serial No. 2016200989, First Examiner Report dated Feb. 13, 2017", 3 pgs.
"Australian Application Serial No. 2016200989, Response dated May 8, 2017", 16 pgs.
"Canadian Application Serial No. 2,856,863, Office Action Response dated Mar. 8, 2017", 2 pgs.
"Chinese Office Action Application Serial No. 201280062205.1, Office Action Response dated Feb. 23, 2017", with machine translation, 18 pgs.
Office Action received for Korean Patent Application No. 10-2016-7029447, dated Dec. 28, 2017, 13 pages.
Google, "Google AdWords", Retrieved from the Internet URL:<https://adwords.google.com/intl/en_in/home/>, accessed on Mar. 26, 2018, 5 pages.
Office Action received for Canadian Patent Application No. 2,856,863, dated Jul. 19, 2017, 6 pages.
Office Action received for Chinese Patent Application No. 201280062205.1, dated Jul. 5, 2017, 16 pages.
Response to Office Action dated Oct. 20, 2017 for Chinese Patent Application No. 201280062205.1, dated Jul. 5, 2017, 12 pages.
Communication Pursuant to Article 94(3) EPC received for European Patent Application No. 12857280.7 dated Jul. 28, 2017, 8 pages.
Response to Communication Pursuant to Article 94(3) EPC dated Nov. 24, 2017 for European Patent Application No. 12857280.7 dated Jul. 28, 2017, 9 pages.
Third Examiner Report received for Australian Patent Application No. 2016200989, dated Oct. 23, 2017, 5 pages.
Response to Office Action dated Feb. 27, 2018 for Korean Patent Application No. 10-2016-7029447, dated Dec. 28, 2017, 18 pages.
Response to Office Action dated Jan. 16, 2018 for Canadian Patent Application No. 2,856,863, dated Jul. 19, 2017, 12 pages.
Trial Board Decision received for korean Patent Application No. 10-2014-7019728, dated Aug. 28, 2018, 17 pages.
Final Office Action received for Korea Patent Application No. 10-2016-7029447, dated Jul. 26, 2018, 6 pages (3 pages of English Translation and 3 pages of Official Copy).
Office Action received for Canada Patent Application No. 2,856,863, dated Jun. 26, 2018, 5 pages.
Response to Office Action filed on Aug. 28, 2018, for Canada Patent Application No. 2,856,863, dated Jun. 26, 2018, 4 pages.
Office Action received for Chinese Patent Application No. 201280062205.1, dated Sep. 7, 2018, 16 pages.
Summons to Attend Oral Proceedings receive for European Application No. 12857280.7, dated Jun. 28, 2018, 10 pages.

* cited by examiner

SYSTEMS AND METHODS FOR PROVIDING INFORMATION BASED ON LOCATION

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011 eBay, Inc., All Rights Reserved.

TECHNICAL FIELD

This patent document pertains generally to network communications, and more particularly, but not by way of limitation, to systems and methods for providing information based on location.

BACKGROUND

While shopping, customers may rely on coupons, club member discounts, temporary price cuts, or other discounts to save money on their purchases. In some instances, it may be difficult for a customer to determine which discounts apply to which items on the store shelf.

BRIEF DESCRIPTION OF DRAWINGS

Some embodiments are illustrated by way of example and not limitation in the figures of the accompanying drawings.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details. As used herein, the term "or" is inclusive unless otherwise noted.

As used herein, the term "item" is used to refer to an individual instance of a good for sale. An item may be fungible or substantially identical to other items. For example, a can of vegetables having a certain size and a certain brand may be substantially identical to other cans of vegetables having the same contents, size, and brand. The term "product" is used to refer collectively to a plurality of items that are substantially identical. As such, each item corresponding to one product can be described using the same description.

An incentive system is provided herein to assist users to manage available incentives to purchase certain products by providing information based on the location of the user. An incentive may be a coupon, a discount, a bulk deal, a loyalty card reward, or some other benefit that will accrue to the user upon purchasing a certain product or products.

In a bricks-and-mortar store, items for sale are displayed on one or more shelves. As the customer walks among the shelves, the customer selects items to purchase. Some items may be associated with one or more incentives to purchase the product corresponding to the item. However, the incentives may not be posted on the shelves.

The systems and methods described herein provide an interface having a display that includes a pictorial representation of the shelf in the store and icons that indicate that an incentive is available for a particular product.

Figure 1:
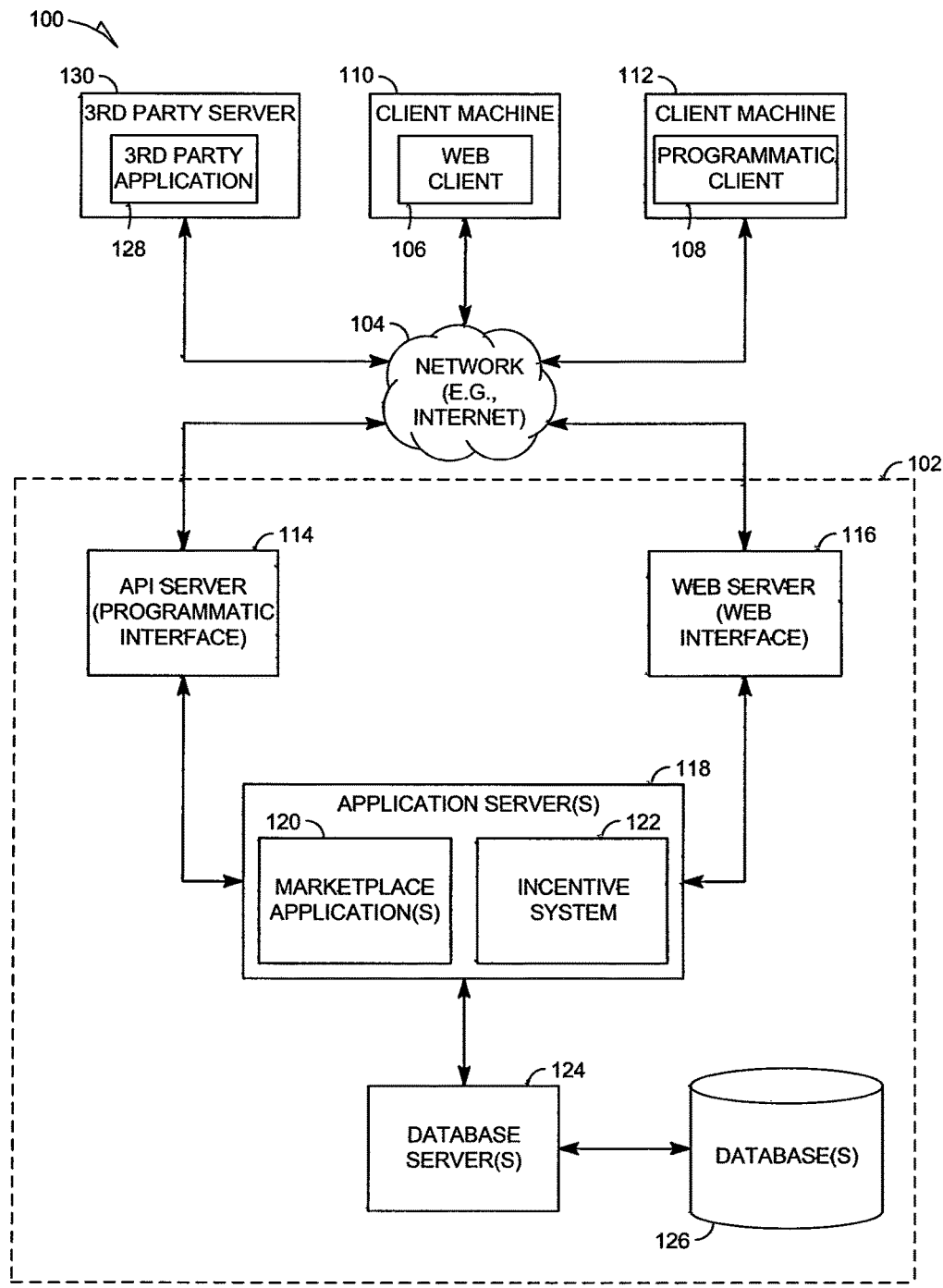
FIG. 1 is a network diagram depicting a client-server system within which one example embodiment may be deployed.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112. The client machine 110 or 112 may comprise a mobile device such as a mobile phone or other handheld device.

An Application Program Interface (API) server 114 and a web server 116 are coupled to, and provide programmatic and web interfaces respectively to, one or more application servers 118. The application servers 118 host one or more marketplace applications 120 and incentive systems 122. The application servers 118 are, in turn, shown to be coupled to one or more databases servers 124 that facilitate access to one or more databases 126.

The marketplace applications 120 may provide a number of marketplace functions and services to users that access the networked system 102. The incentive systems 122 may likewise provide a number of incentive services and functions to users. The incentive systems 122 may provide the user with incentives to purchase particular products using an augmented reality display. While the marketplace applications 120 and the incentive systems 122 are shown in FIG. 1 both form part of the networked system 102, it will be appreciated that, in alternative embodiments, the incentive systems 122 may form part of an incentive service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace applications 120 and the incentive systems 122 could also be implemented as standalone software programs, which do not necessarily have networking capabilities.

The web client 106 accesses the various marketplace applications 120 and the incentive systems 122 via the web interface supported by the web server 116. Similarly, the programmatic client 108 accesses the various services and functions provided by the marketplace applications 120 and incentive systems 122 via the programmatic interface provided by the API server 114. The programmatic client 108 may, for example, be an application for a mobile device to enable customers to access the augmented reality display provided by the incentive systems 122 on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
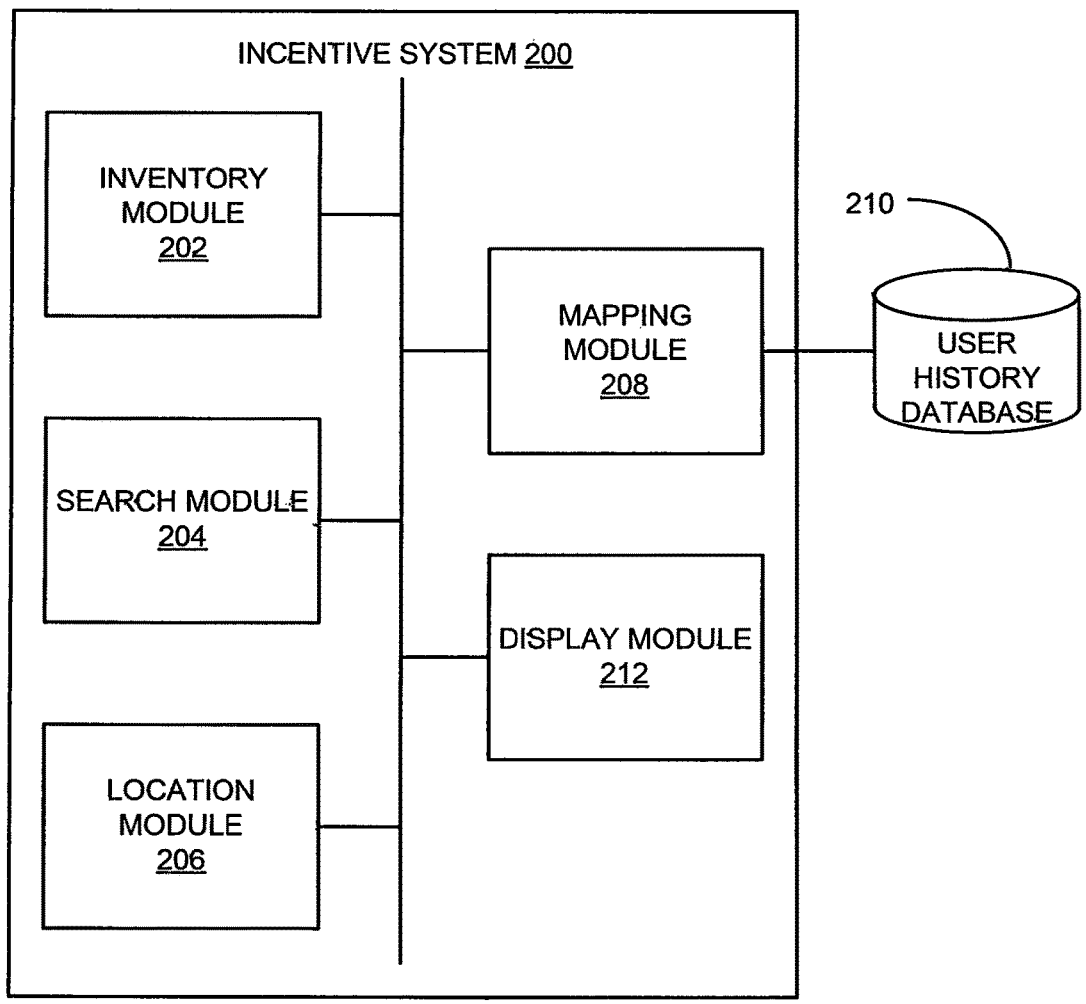
FIG. 2 is a block diagram of an example incentive system according to some embodiments.

FIG. 2 is a block diagram of an example incentive system 200 according to some embodiments. The example incentive system 200 may be the incentive system 122. The incentive system 200 may be implemented in hardware, software, or as a combination of hardware and software.

An inventory module 202 is configured to identify an instance of a product for sale positioned within a field of vision of a user based on an input received from the user. The instance of the product for sale is an item for sale that conforms to the product description of the product. A product may be identified by a UPC code or SKU code, for example. For example, the product may be a branded 14-oz. can of diced tomatoes. The instance of the product (e.g., the item for sale) is the particular branded 14-oz. can of diced tomatoes positioned on the grocery store shelf.

A field of vision of the user is what the user sees within the store as the user is traversing the stores. The field of vision of the user may be a hypothetical field of vision or a captured field of vision. The field of vision may include a depiction of a portion of shelves in the store, an end-cap located at the end of an aisle in the store, a special promotional display, a portion of a rack or bin in the store, a portion of a display case, or some other structure within the store.

A hypothetical field of vision may be determined based on what a typical user would see within the store. The hypothetical field of vision may be generated based on the layout of the store and positions within the store where the user might stand to view items for sale. In embodiments using a hypothetical field of vision, the instance of the product may be identified based on an input that identifies the immediate position of the user within the store. For example, the user may provide an input indicating the user's position in the store. The input may be a global positioning system (GPS) input, an alphanumeric input, or an image capture input. An input may include a series of numbers and letters that identify a hypothetical field of vision.

To illustrate, the store may post a sign (i.e., a position marker) on or near a portion of shelving identified as a hypothetical field of vision. The sign may include a series one or more letters or numbers identifying the hypothetical field of vision from a plurality of hypothetical fields of vision within the store. In some instances, the sign may include a QR code. In some instances, the user may simply type the series of alphanumeric characters into the mobile device of the user. In other instances, the user may capture an image of the sign using a digital camera. The inventory module 202 may then use optical character recognition (OCR) to process the image to identify the series of alphanumeric characters.

A captured field of vision may be captured by the user using, for example, a digital camera. The captured field of vision may include images of one or more items arranged on a shelf in a store. The captured image may be processed to recognize multiple different products corresponding to the items captured in the image. Some techniques that may be used singly or in combination to perform the recognition include, but are not limited to, color matching based on a distribution of colors in the image, edge recognition, line recognition, whole image analysis based on scaling and rotations, and optical character recognition.

A search module 204 is configured to identify one or more incentives to incentivize the user to purchase a product identified by the inventory module 202. The search module 204 may access an incentive database (not shown) that stores records of incentives offered to shoppers. The search module 204 may further initiate a search of a network to access further databases such as a database maintained by the retailer, a database maintained by a distributor, a database maintained by a manufacturer, or a publically available database available via, for example, the World Wide Web.

A location module 206 is configured to generate a pictorial representation of the field of vision of the user. An image of the product is located in the pictorial representation based on the position of the product in the field of vision of the user relative to other objects within the field of vision of the user. The pictorial representation may be generated along with data identifying the location of each image of a product within the pictorial representation. The data may indicate which pixels of the pictorial representation correspond to the image of the product. In pictorial representations where more than one product image is depicted, the data may indicate which pixels of the pictorial representation correspond to each product image in the pictorial representation. In some instances, the data may further include an indication if a particular pixel or set of pixels corresponds to an edge, corner, or other specific portion of the image of the product.

A mapping module 208 is configured to map an icon representing at least one of the one or more incentives to a location corresponding to position of an image of the product within the pictorial representation. For example, the mapping module 208 may determine that a particular product depicted in the pictorial representation is associated with a particular incentive available to a user purchasing the product. The map includes an icon to the pixels corresponding to the image of the product in the pictorial representation, replacing the portion of the image of the product with pixels constituting the icon. The icon may be defined by shape, one or more alphanumeric characters, smaller icons included in the icon, size, color. In a user interface, when a user passes over an icon using a finger or pointer, the icon may be associated with a sound, a vibration, or other feedback signal. An icon may have a predetermined placement on the product (e.g., in a top right corner) or may be placed by the mapping module 208. The mapping module 208 may place the icon based on a distribution of icons, a number of icons associated with the products, or the like.

The icon mapped to a product image may be selected from a plurality of available icons that can be mapped. For a particular incentive, an icon may be selected according to a number of factors such as, a type of the incentive, a provider of the incentive, a value of the incentive, a program associated with the incentive, a beneficiary of the incentive other than the user (e.g., a charity), or other characteristic of the incentive. A particular product may be associated with one or more incentives or icons.

In some instances, the mapping module 208 may be configured to access a user history database 210. The user history database 210 may include one or more records about a purchase history of the user. The record may include an identification of previous purchases made by the user, ratings about the previous purchases submitted by the user, an identification of another user or users known to the user, affiliations of the user, and additional user-specific information. The other user known to the user may be a spouse, roommate, family member, colleague, or friend of the user. The other user may be selected by the user from a plurality of other users who are each known to the user. In some instances, the other user may represent a corporate entity.

Based on the records stored in the user history database 210, the mapping module 208 may map additional icons to the product images in the pictorial representation. The icons may indicate that a particular product has been previously purchased by the user or another user, has been designated as a "favorite" by the user or the other user, or has been added to a wish list by the user or the other user.

A display module 212 is configured to provide a user interface to a client device of the user. The user interface includes a display comprising the icon located within the pictorial representation at a location corresponding to the position of the image of the product. The user interface may be referred to as an "augmented reality" display. An example of the user interface is provided in FIG. 4.

The display module 212 may provide one or more additional user interfaces based on selections received from the user. The additional user interfaces may provide information to the user about the product or incentives associated with the product. The additional user interfaces may provide information accessed from the user history database 210.

Figure 3:
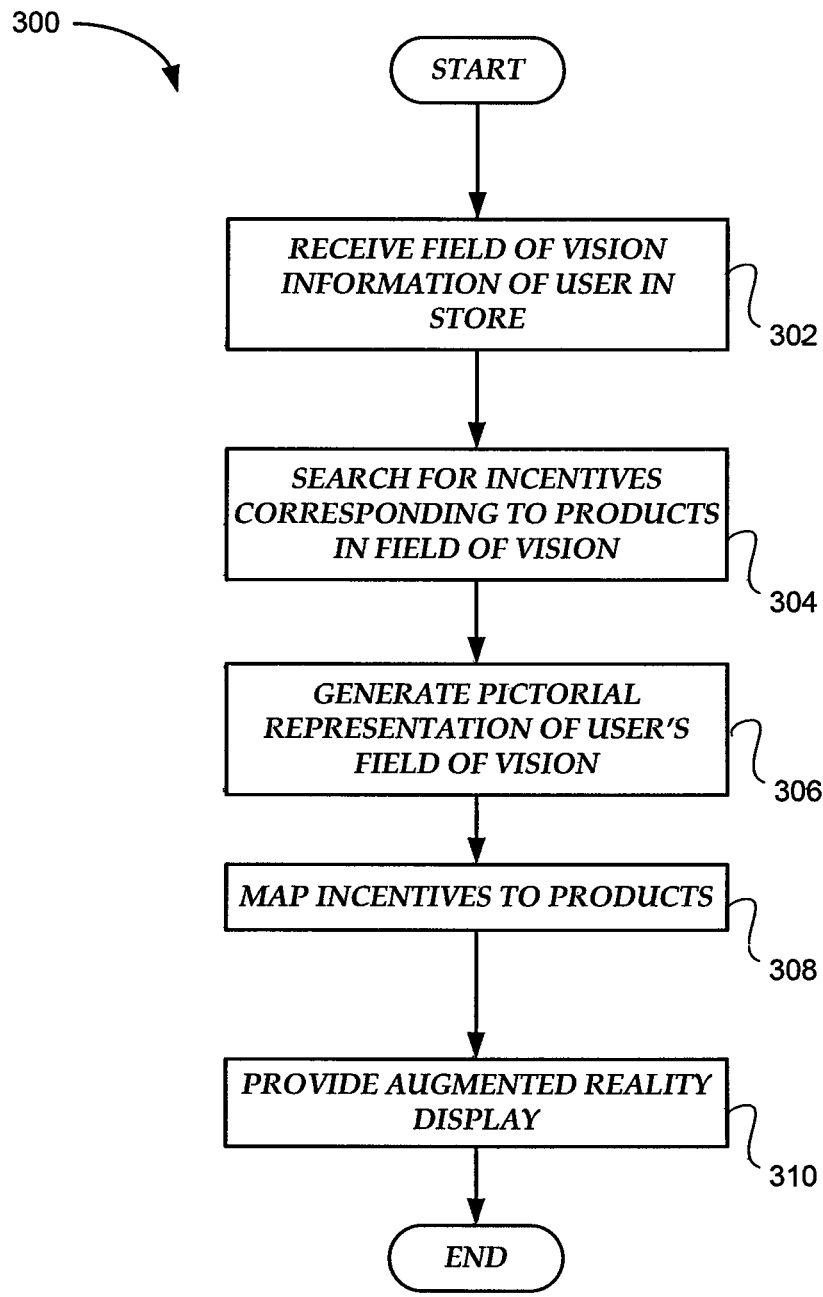
FIG. 3 is a flow chart illustrating a method to provide information based on location, according to an example embodiment.

FIG. 3 is a flow chart illustrating a method 300 to provide information based on location, according to an example embodiment. The method 300 may be performed by the incentive system 200 or the incentive system 122.

In an operation 302, field of vision information is received from a user. The field of vision information may include an image captured by the user using a digital camera (e.g., an image of the user's field of vision, an image of a sign identifying the user's field of vision, or an image of a QR code identifying the user's field of vision) or a series of alphanumeric characters input by the user. Based on the field of vision information, product information about products in the user's field of vision is accessed. The products may be identified according to a UPC or SKU code.

In an operation 304, a search is conducted for incentives corresponding to the products in the user's field of vision. The search is based on the product information. The search may be specific to incentives offered by the retailer.

In an operation 306, a pictorial representation of the user's field of vision is generated. The pictorial representation may be an image captured by the user or may be an image generated independently of the user. The pictorial representation may include additional data indicating the position of the products depicted in the pictorial representation.

In an operation 308, the incentives are mapped to the products in the pictorial representation. The incentives corresponding to each product may be represented by one or more icons added to the pictorial representation. Additional information associated with the product or user history associated with the product may also be mapped to the images of the products on the pictorial representation.

In an operation 310, an augmented reality display is provided. The augmented reality display includes the pictorial representation of the user's field of vision and one or more icons positioned over or adjacent to images of products within the pictorial representation.

Figure 4:
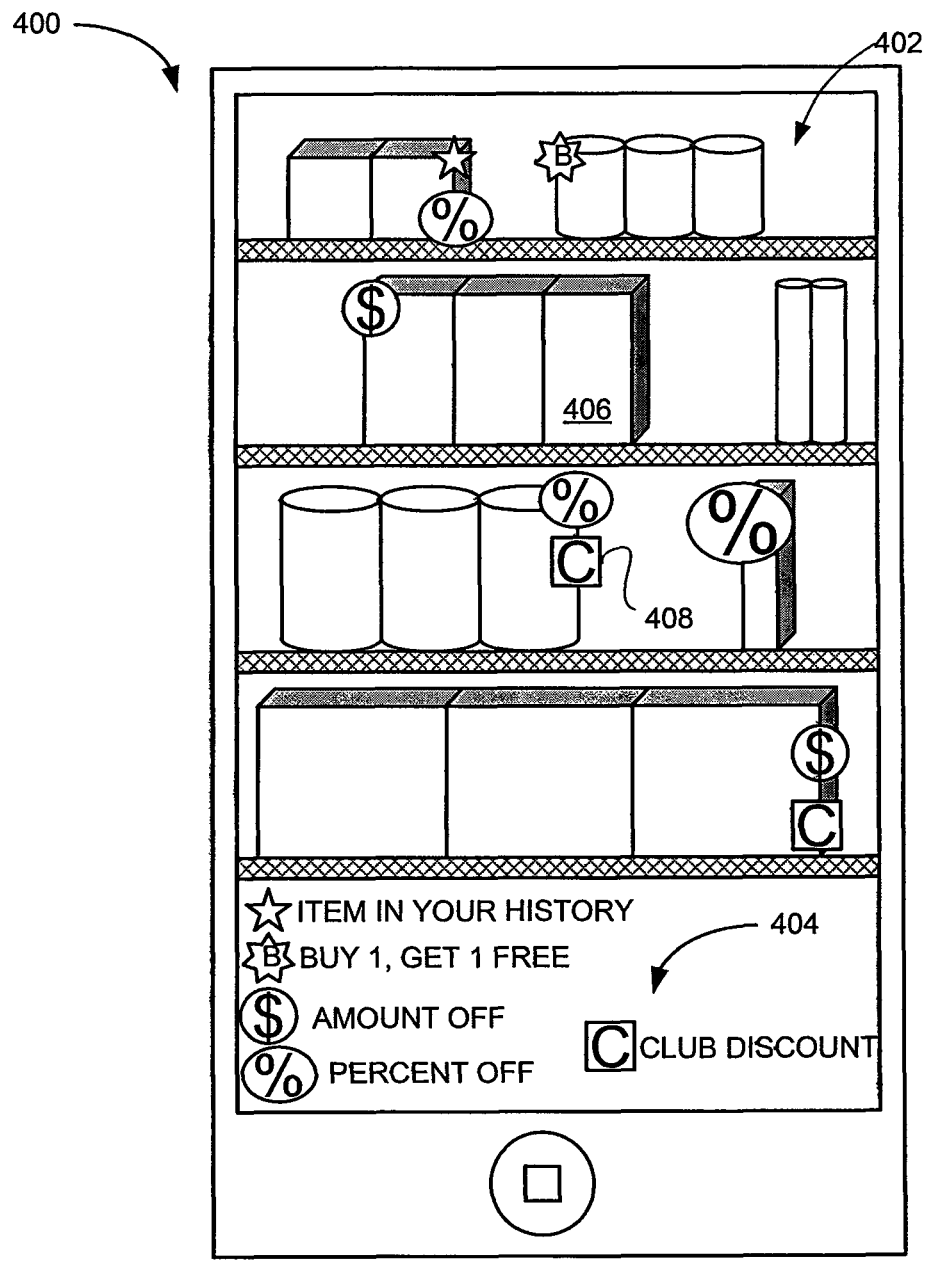
FIG. 4 is an example user interface generated according to an example embodiment.

FIG. 4 is an example user interface 400 generated according to an example embodiment. The example user interface 400 comprises the pictorial representation 402 of the user's field of vision and a legend 404. The user interface 400 may receive input from a user via, for example, a touch screen.

The pictorial representation 402 includes, in the example depicted, a picture of a portion of store shelves supporting items for sale. The pictorial representation may be a drawing or a photograph of the field of vision. The pictorial representation 402 includes product images such as product image 406 and icons such as icon 408. The icons may partially or completely overlap a product image corresponding to the product identified with an incentive. In some embodiments, the icon may be adjacent to, but not overlap the product image. The icons may vary in size, shape, color, or other identifying characteristics.

In some instances, the user may be provided an option to view the products in the field of vision as a list of the products. The list of the products may be sortable according to position within the field of view of the user. To illustrate, the list may list the products in the field of vision from left to right and from top to bottom.

The example user interface 400 further includes a legend 404 that includes the icons used in the pictorial representation and a definition of the icon. The legend 404 may be optional and the user may be provided an option to hide or show the legend.

Figure 5:
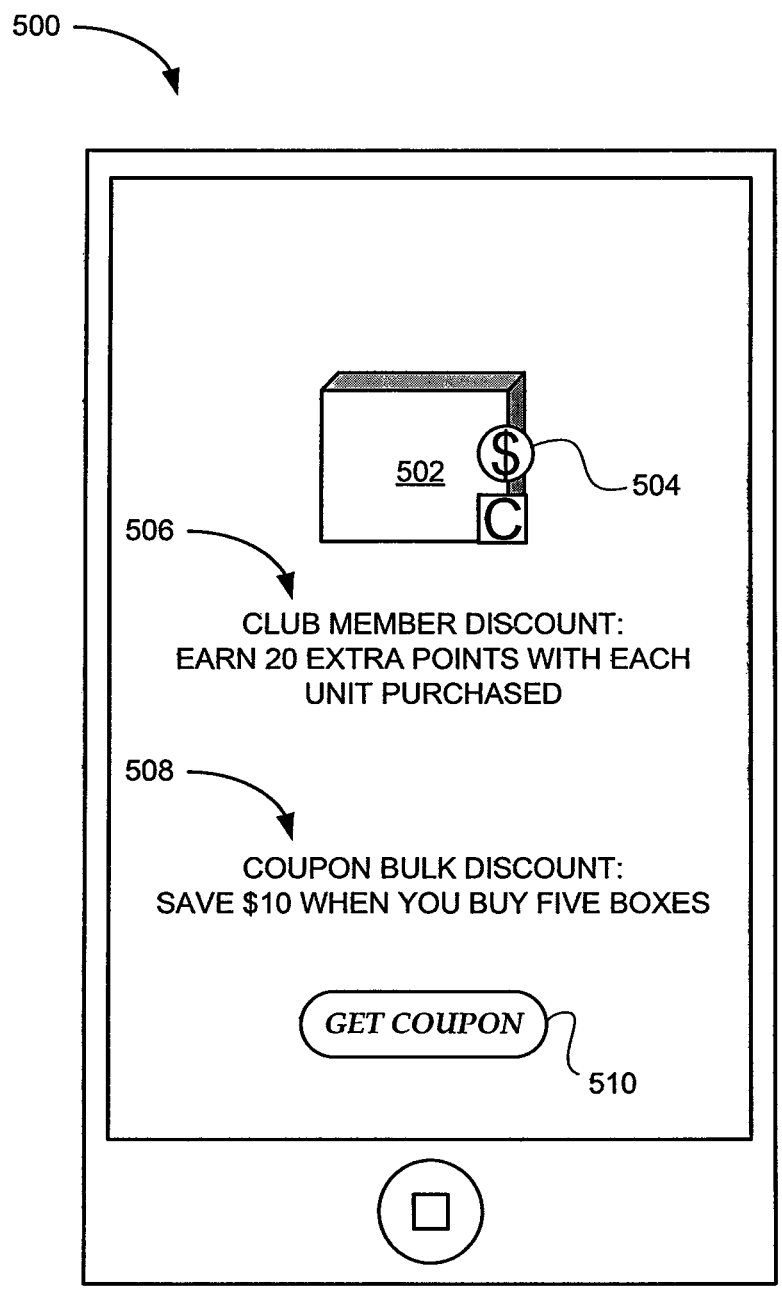
FIG. 5 is another example user interface generated according to an example embodiment.

FIG. 5 is another example user interface 500 generated according to an example embodiment. The example user interface 500 may be presented to the user upon receiving a selection of a product image in the pictorial representation 402. The example interface includes a product image 502 along with the icons 504 assigned to the product image in the pictorial representation 402. Additional information, such as a product description or user history information may be displayed in the example user interface 500.

A description of an automatic incentive 506 is displayed. The automatic incentive 506 accrues to the user automatically at checkout or upon scanning a club card or other loyalty program identifier at a point of service (POS) station in the store.

A description of a redeemable incentive 508 is also displayed. A redeemable incentive does not necessarily accrue automatically to the user. Instead the user may be required to present a coupon at checkout and/or perform some other action (e.g., purchase a particular number of items). A button 510, when selected, causes the user's device to download the coupon associated with redeemable incentive 508.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 6:
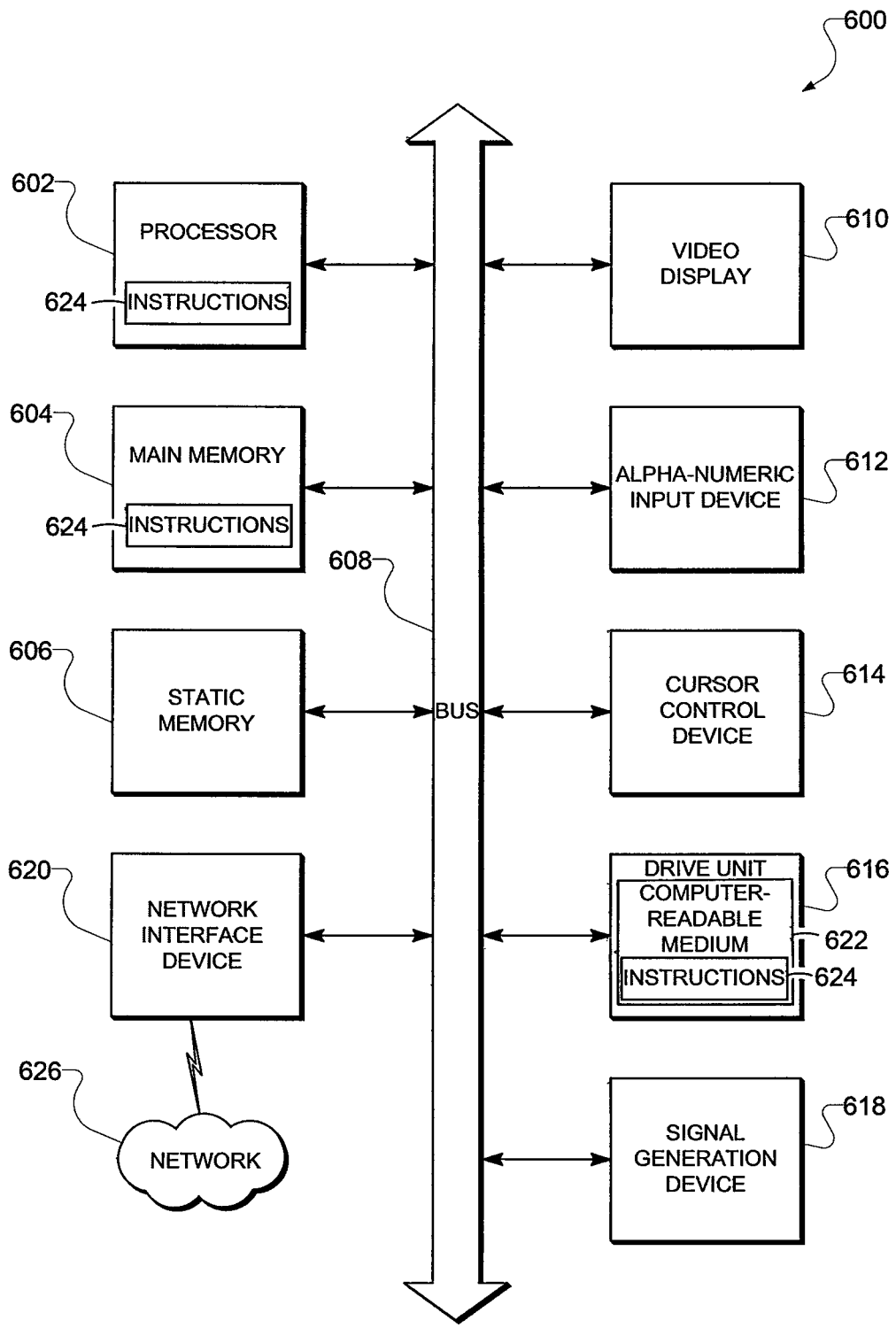
FIG. 6 is a block diagram of machine in the example form of a computer system within which a set instructions, for causing the machine to perform any one or more of the methodologies discussed herein, may be executed.

FIG. 6 is a block diagram of machine in the example form of a computer system 600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

Machine-Readable Medium

The disk drive unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   a hardware processor;
   an inventory module including multiple instructions that, when executed by the hardware processor:
   receive an image of a marker that identifies a particular field of vision for a user located proximal to the marker; and
   identify the particular field of vision by processing the image of the marker;
   a search module including multiple instructions that, when executed by the hardware processor, identify-one or more products that are in the particular field of vision, at least one of the one or more products corresponding to an incentive;
   a location module including multiple instructions that, when executed by the hardware processor, generate a pictorial representation of the particular field of vision, the pictorial representation including a product image for each of the one or more products corresponding to the incentive, each product image being positioned within the pictorial representation based on a position of the corresponding product in the particular field of vision;

a mapping module including multiple instructions that, when executed by the hardware processor, modify the product image for at least one of the one or more products corresponding to the incentive by causing the product image to display:
  a first icon representing the incentive; and
  a second icon indicating that a second user associated with the user has previously purchased or favorited the product associated with the modified product image; and
a display module including multiple instructions that, when executed by the hardware processor:
  generate a user interface for display at a client device, the user interface configured to display the pictorial representation with the modified product image; and
  display, responsive to receiving a selection of the second icon, a second user interface including additional information about the second user associated with the user having previously purchased or favorited the product associated with the modified product image.

2. The system of claim 1, wherein the image of the digital marker is captured by a camera of the client device.

3. The system of claim 1, the location module further configured to identify the particular field of vision in response to receiving a selection of one of multiple possible fields of vision.

4. The system of claim 3, wherein receiving the selection comprises receiving a second image of a code captured by the client device.

5. The system of claim 1, the mapping module further configured to modify the modified product image to display a third icon representing a purchase history of the user for the product associated with the modified product image.

6. The system of claim 5, the display module further configured to receive a selection of the third icon and, responsive to the selection of the third icon, generate a third user interface including additional information about the purchase history of the user for the product represented by the modified product image.

7. The system of claim 1, the display module further configured to receive a selection of the first icon and, responsive to receiving the selection of the first icon, generate an additional user interface, the additional user interface including additional information about the incentive.

8. The system of claim 1, the display module further configured to receive a selection of a product image for one of the one or more products in the pictorial representation and, responsive to receiving the selection of the product image, generate an additional user interface including additional information about the incentive corresponding to the selected product image.

9. The system of claim 1, wherein the incentive comprises a discount, a loyalty reward, or a gift corresponding to the at least one of the one or more products.

10. The system of claim 1, the display module further configured to generate the user interface as including an option that is selectable to cause display of the icon, the second icon, and information describing the incentive as a list.

11. The system of claim 1, the mapping module configured to modify the product image for the at least one of the one or more products corresponding to the incentive by altering a display of a subset of pixels that include a display of the product image to display the first icon and the second icon and maintaining a display of other ones of the pixels that include the display of the product image.

12. The system of claim 1, wherein the image of the marker includes a series of alphanumeric characters that identify the particular field of vision and the inventory module is configured to identify the particular field of vision by processing the series of alphanumeric characters using optical character recognition.

13. A method comprising:
  receiving, from a digital camera of a computing device, an image of a marker comprising a series of alphanumeric characters that identify a field of vision for a user located proximal to the marker;
  identifying, by the computing device, the field of vision by processing the series of alphanumeric characters in the image using optical character recognition;
  identifying, by the computing device, one or more products for sale that are positioned within the field of vision;
  identifying, by the computing device, at least one of the one or more of the products that correspond to an incentive;
  generating, by the computing device, a pictorial representation of the field of vision, the pictorial representation including a product image for each of the one or more products that are positioned within the field of vision;
  modifying, by the computing device, a product image for the at least one of the one or more products that correspond to the incentive by causing the product image to display:
    a first icon representing the incentive; and
    a second icon indicting that a second user associated with the user has a purchase history associated with the incentive or the at least one of the one or more products that correspond to the incentive;
  and
  generating, by the computing device, a user interface that includes a display of the pictorial representation.

14. The method of claim 13, further comprising receiving a selection of the second icon and generating, responsive to receiving the selection of the second icon, an additional user interface including information describing the purchase history of the second user associated with the user.

15. The method of claim 13, wherein modifying the product image for the at least one of the one or more products comprises altering a display of a subset of pixels that include a display of the product image to display the first icon and the second icon and maintaining a display of other ones of the pixels that include the display of the product image.

16. The system of claim 1, wherein an indication of the incentive is not included in the particular field of vision for the user located proximal to the marker.

17. The system of claim 1, the inventory module further configured to receive an image of the particular field of vision and generate the pictorial representation of the particular field of vision using the received image of the particular field of vision.

18. The system of claim 17, the search module further configured to identify at least one of the one or more products that are in the particular field of vision based on a universal product code or a stock keeping unit code included in the received image of the particular field of vision.

19. A non-transitory computer-readable medium storing instructions that are executable by one or more computing devices to perform operations comprising:

receiving, from a digital camera, an image of a marker comprising a series of alphanumeric characters that identify a field of vision for a user located proximal to the marker;

identifying one or more products that correspond to an incentive and are positioned within the field of vision;

generating a pictorial representation of the field of vision, the pictorial representation including a product image for each of the one or more products that correspond to the incentive, each product image being positioned based on respective positions of the one or more products in the field of vision;

modifying a product image for at least one of the one or more products that correspond to the incentive by causing the product image to display:
  a first icon representing the incentive;
  a second icon indicating that a second user associated with the user has a purchase history associated with the incentive or the at least one of the one or more products that correspond to the incentive; and
  a third icon indicating that the user has a purchase history associated with the incentive or the at least one of the one or more products that correspond to the incentive;

and
  generating a user interface that includes a display of the pictorial representation including the modified product image.

20. The non-transitory computer-readable medium of claim 19, the operations further comprising receiving a selection of the second icon and generating, responsive to receiving the selection of the second icon, an additional user interface including information describing the purchase history of the second user associated with the user.

21. The non-transitory computer-readable medium of claim 19, the operations further comprising receiving a selection of the third icon and generating, responsive to receiving the selection of the third icon, an additional user interface including information describing the purchase history of the user.

22. The non-transitory computer-readable medium of claim 19, wherein modifying the product image for the at least one of the one or more products comprises altering a display of a subset of pixels that include a display of the product image to display the first icon, the second icon, and the third icon and maintaining a display of other ones of the pixels that include the display of the product image.

* * * * *